Jan. 31, 1967     C. A. GAPEN     3,301,301
VEHICLE PNEUMATIC TIRE COMPOSITION
Filed Oct. 13, 1964
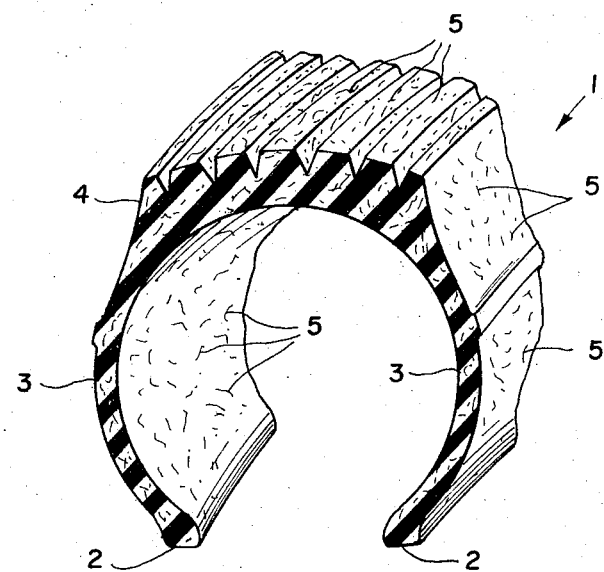
INVENTOR.
CLARENCE A. GAPEN
BY
his ATTORNEY

United States Patent Office 3,301,301
Patented Jan. 31, 1967

3,301,301
VEHICLE PNEUMATIC TIRE COMPOSITION
Clarence A. Gapen, P.O. Box 818,
Morgantown, W. Va. 26505
Filed Oct. 13, 1964, Ser. No. 403,640
1 Claim. (Cl. 152—330)

This invention relates to a vehicle pneumatic tire composition, and, more particularly, to the composition of the sidewalls and of the base portion of the tread layer of the tire.

An outstanding disadvantage of conventional vehicle pneumatic tires having a carcass formed of one or more layers of woven cord is that as the result of continual flexing of the sidewalls or base portion of the tread layer of the tire, the woven cord tends to break as the result of the heat developed, such as occurs when constantly flexing or bending metal or any other object. Moreover, when there is a break in the cord, or when substantial heating occurs, there is a great tendency for separation of the tread rubber layer from the base layer and for air pockets to develop that will often result in a blowout.

An object of the present invention is to provide a novel vehicle pneumatic tire composition which is completely devoid of the above named disadvantages since it is completely devoid of the well known cord layers forming the carcass of the conventional tire, and which is even less stretchable than the conventional tire, yet which is stronger and has greater life.

Another object of the present invention is to provide a vehicle tire composition which may be repaired more easily and more frequently and which may be repaired when punctured to such extent that a cord type tire would be rendered useless.

Other objects and advantages will become more apparent from a study of the following description taken with the accompanying drawing wherein:

The single figure of the drawing is a cross-sectional view of a fragmentary portion of a tire embodying my invention.

Referring to the drawing, numeral 1 generally designates a fragmentary portion of a tire having bead portions 2, sidewall portions 3, and a tread portion, all of which portions have interspersed uniformly throughout cords 5 of short length, preferably of cotton.

In accordance with the present invention, the cord carcass, that is, the woven cord layers or plies, which normally extend along the sidewalls and base layer of the tread, are completely eliminated. Instead, the entire sidewalls and base layer of the tread are made solely of rubber, either natural or synthetic, having interspersed substantially uniformly therein, random oriented pieces of cotton strings or cords having lengths from about 1″ to 3″ and, in some instances, having pieces of lengths of a fraction of an inch to greater than 3″. In some situations, instead of using cotton strings or cord, they may be made of synthetic fibers, such as nylon, rayon, Teflon and other synthetic linear polyamides.

In some instances, the cotton strings or strings of other material, may be formed into a mat and then impregnated with rubber. The amount of cotton strings may be varied over wide limits depending upon the particular string material used, number of strands, the diameter of the strands and lengths thereof so as to give the desired reinforcement.

The resulting tire, whose sidewalls and base layer are reinforced with pieces of string, has even less stretchability than a tire having cord layers of the conventional type. Moreover, the tire has greater tensile strength and does not develop heat in the manner developed in conventional cord tire construction, therefore separation and blowouts are less likely to occur. Also, in case of a puncture, the tire may be readily repaired by conventional means, whereas in the case of a cord-layered tire, such puncture might render the tire useless. Thus a tire embodying the present invention may be repaired frequently.

Thus it will be seen that I have provided an efficient vehicle tire composition to give less likelihood of blowouts and to give considerably longer life to the tire by minimizing the development of heat, separation, air pockets and the like, and which tire has greater tensile strength and is more easily repairable and more often repairable than conventional tires.

While I have illustrated and described several embodiments of my invention, it will be understood that these are by way of illustration only, and that various changes and modifications may be made within the contemplation of my invention and within the scope of the following claim.

I claim:

A vehicle pneumatic tire having sidewalls and a tread and being devoid of cord layers and superimposed sheets and consisting of solid rubber throughout having randomly oriented cotton strings substantially uniformly dispersed therein throughout the entire body of the tire and the tread throughout their thickness and circumference, said strings being of lengths from about a fraction of an inch to about 3 inches.

References Cited by the Examiner

UNITED STATES PATENTS

| | | | |
|---|---|---|---|
| 1,000,781 | 8/1911 | Collier | 152—323 X |
| 1,629,517 | 5/1927 | Marshall | 152—330 X |
| 3,057,389 | 10/1962 | Dubetz et al. | 152—354 X |
| 3,066,716 | 12/1962 | Fishman | 152—323 |

FOREIGN PATENTS 11,554    1914    Great Britain.

ARTHUR L. LA POINT, *Primary Examiner.*

C. W. HAEFELE, *Assistant Examiner.*